Figure 1:
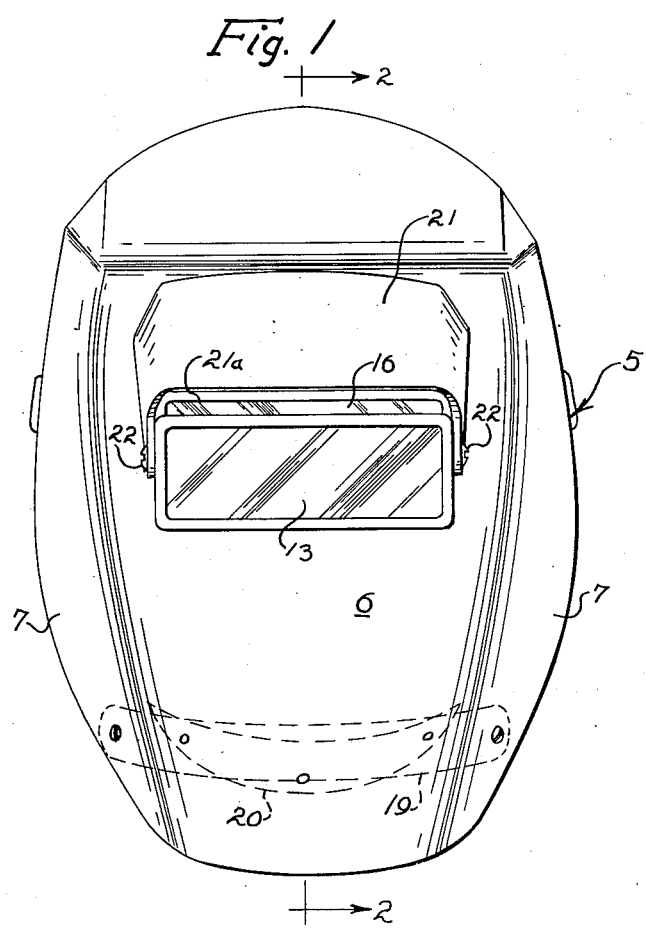

July 7, 1953   J. H. JACOBS   2,644,160
WELDING SHIELD WITH OFFSET LENSES
Filed Dec. 10, 1951   2 Sheets-Sheet 1

INVENTOR
JOSEPH H JACOBS
BY
Williamson & Williamson
ATTORNEYS

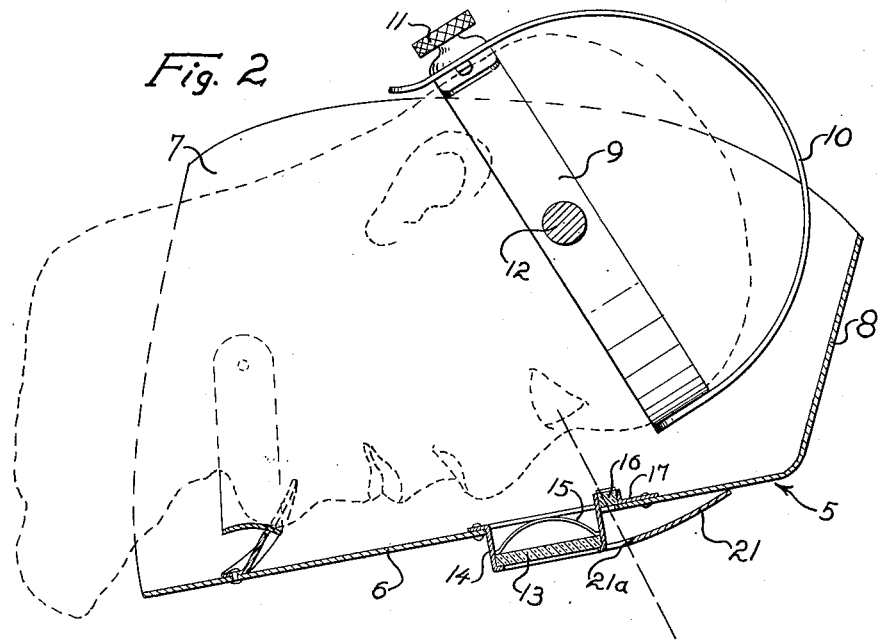
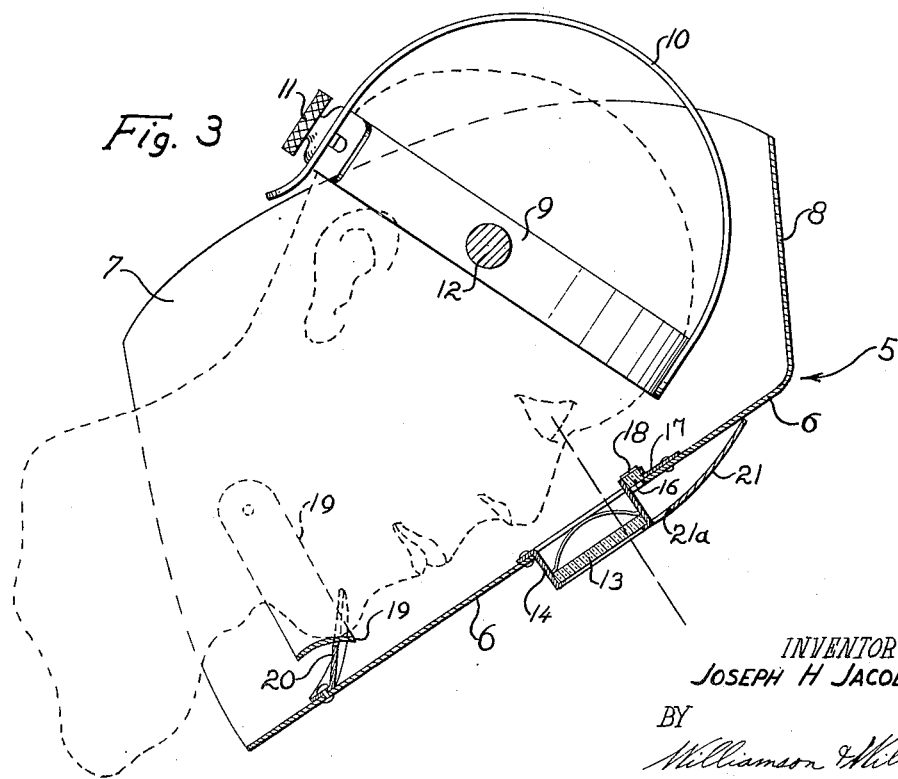

Patented July 7, 1953

2,644,160

UNITED STATES PATENT OFFICE 2,644,160

WELDING SHIELD WITH OFFSET LENSES

Joseph H. Jacobs, Minneapolis, Minn., assignor to Jacobs Wind Electric Company, Minneapolis, Minn., a corporation of Montana Application December 10, 1951, Serial No. 260,914

3 Claims. (Cl. 2—8)

This invention relates generally to welding shields.

While the welding shield disclosed and claimed in my co-pending application entitled Face and Eye Protector Shield for Welders, filed September 17, 1951, Serial No. 246,927, has proved to be highly efficient and a great improvement over conventional welding shields, I have designed my present shield for even more efficient operation and for simplified construction.

It is an object of my present invention to provide a novel and highly efficient welding shield constructed to produce all of the advantages embodied in my above identified welding shield and to provide in addition to these advantages even more efficient shielding of the welder's face and eyes while simplifying the manufacture thereof.

It is another object to provide a welding shield constructed to permit a welder to obtain an unrestricted view of the work by merely a slight tilting movement of the head and without shifting the shield relative to his head and face and thereafter by merely tilting his head upwardly to interpose a light restrictive lens between the welding arc to be struck and his eyes, thus enabling the shield to be maintained in protective position at all times.

More specifically, it is an object to provide a welding shield having an opaque face protective portion with a light restrictive protective lens inserted therein to permit direct viewing of a welding arc and also having a transparent protective lens disposed above the restrictive lens and positioned in rearwardly spaced relation therebehind with an opaque rearwardly extending frame element surrounding the upper portion of the light restrictive lens and adjacent the inner edge of which said transparent lens is positioned, said shield also having an outer visor member lying in substantially the same plane as the restricted lens and having its lower edge disposed in slightly spaced relation above said restrictive lens to provide a viewing slit through which the work may be viewed under normal lighting conditions without raising the shield or shifting the same relative to the face of the welder.

These and other objects and advantages of my invention will more fully appear from the following description made in connection with the accompanying drawings wherein like reference characters refer to the same or similar parts throughout the several views and in which:

Fig. 1 is a front elevational view of my new welding shield;

Fig. 2 is a longitudinal vertical sectional view taken substantially along the line 2—2 of Fig. 1 and showing a welder's head by dotted lines in downwardly tilted position to permit viewing of the work through the transparent lens as indicated by the dash line of sight; and Fig. 3 is a longitudinal vertical sectional view taken similarly to Fig. 2 but showing the welder's head in raised position with the light restrictive lens in protected position in front of the welder's eyes.

As illustrated in the accompanying drawings, I provide a generally concave protective shield 5 made from suitable fireproof opaque sheet material and adapted to surround the face and forward head portion of a welder. The shield 5 in the form shown has a substantially flat front panel 6 with a pair of rearwardly extending side panels 7 and a rearwardly extending top panel 8. A head band 9 of conventional design has an arched top strap 10 connected therewith and is adjustable by the knurled clamping screw 11 in the conventional manner. The sides of the head band 9 are pivotally connected to the respective side panels 7 as by the pivot pins 12 to permit the entire shield structure to be swung upwardly and downwardly thereon.

The front panel 6 of the shield 5 has an opening in the upper portion thereof and a light restrictive lens 13 is mounted in said opening and is secured thereto as by the peripheral frame 14 which surrounds the outer periphery thereof and is securely attached to the portion of the shield panel 6 surrounding the lens opening. Any suitable means for retaining the lens 13 within the peripheral frame 14 may be provided such as the resilient clips 15. In the form shown, the restrictive lens 13 is disposed in forwardly spaced relation to the plane of the front panel 6 and the peripheral frame 14 extends forwardly from said front panel, as best shown in Figs. 2 and 3.

A second lens 16 is mounted across the upper portion of said opening in front panel 6 and has its lower edge engaged against the inner portion of the upper side of peripheral frame 14, as best shown in Figs. 2 and 3. Suitable means for retaining the transparent lens 16 in position and sealing the periphery thereof relative to the front shield panel 6 around the upper portion of the opening therein are provided such as the flanged frame member 17 having resilient clips 18 at the ends thereof to retain the same in place. The transparent lens 16 is disposed rearwardly of the restrictive lens 13 and, in the form shown, lies in the plane of front panel 6.

A closure device having an inner chin-engaging strap 19 made from opaque material and an outer light trapping member 20 prevents direct light from adjacent welding arcs from reaching the inside of the shield 5 regardless of the tilted position of the welder's head. An outer visor 21 is pivotally mounted on the ends of peripheral frame 14, as by the pins 22, and has the main body portion thereof disposed above the two lenses 13 and 16. The lower edge 21a of said visor is disposed in upwardly spaced relation above the top side portion of peripheral frame 14 to form an opening therebetween aligned with the transparent lens 16 to permit unrestricted viewing of the work when the welder's head is in downwardly tilted position, as shown in Fig. 2.

The operation of my improved shield as disclosed herein is similar to the operation of my previously identified shield and viewing of the work through an unrestricted lens is permitted by merely tilting the welder's head downwardly a slight distance as shown in Fig. 2 whereby changing of the welding rods and positioning of the welding rods prior to striking the arc is permitted without raising the shield 5 from protective position around the face and forward head portion of the welder.

By offsetting the transparent lens 16 rearwardly, the upper side of the peripheral frame 14 and lens 13 prevent the direct rays from the welding arc from passing through the transparent lens 16 when the welder's head is in raised position as shown in Fig. 3. The shield 21 prevents the rays from adjacent melding arcs from passing through the transparent lens 16 and thus the welder's eyes and face are fully protected from the direct rays of the arcs of not only the welder wearing the shield but also of adjacent welders. When the upper lens 16 becomes dirty it may be cleaned by swinging the visor 21 downwardly in order to afford access to the front surface of said lens.

It will be seen that I have provided an extremely simple and easy to manufacture welding shield adapted to afford complete protection to the welder using the same while permitting unrestricted viewing of the work by merely tilting the head downwardly slightly into the position shown in Fig. 2 without moving the entire shield 5 on its pivots 12. It should be noted that the necessity of the inner visor shown in my co-pending previously identified application has been entirely eliminated with my improved structure herein disclosed.

It will, of course, be understood that various changes may be made in the form, details, arrangement and proportions of the parts without departing from the scope of my invention which, generally stated, consists in the matter shown and described herein and set forth in the appended claims.

What I claim is:

1. Face and eye protective apparatus for welders comprising an inwardly concave, outwardly convex opaque shield adapted to receive and enclose the front portion of a welder's head and face and having an opening in the upper front portion thereof aligned with the welder's eyes when in operative position, a pair of lens members mounted in said opening and closing the same, one of said lenses being highly restrictive to the passage of light therethrough and permitting a welder to view a high intensity welding arc when directing his line of sight therethrough and being disposed in a plane normal to the line of sight therethrough to prevent distortion of the transmitted light rays, said restrictive lens having a relatively large vertical depth, the other lens being transparent to permit viewing therethrough under normal lighting conditions and being disposed above the light restrictive lens and lying in a plane disposed in rearwardly spaced, substantially parallel relation to the plane of the restrictive lens and having a relatively small vertical depth to limit the light rays passing therethrough, and an outer opaque visor mounted across the upper portion of the front of the shield above the upper transparent lens thereof and having the lower edge of the visor disposed in upwardly spaced relation above the top edge of the lower light restrictive lens a distance substantially equal to the vertical depth of the rearwardly disposed transparent lens to provide a pair of spaced aligned viewing openings of relatively small vertical depth to prevent obliquely directed rays from passing therethrough when the wearer is viewing the high intensity welding arc through the restrictive lens.

2. The structure set forth in claim 1, and the lower edge of said visor lying substantially in the plane of the restrictive outwardly spaced lens.

3. The structure set forth in claim 1, and said light restrictive lens having an outwardly extending peripheral casing surrounding the same with said lens disposed in the outer portion thereof to position the restrictive lens in outwardly spaced relation from the plane of the front shield portion and the transparent lens being fixed to said shield in a plane disposed in rearwardly spaced relation to the plane of the restrictive lens, and said visor being pivotally mounted to facilitate cleaning of the transparent lens.

JOSEPH H. JACOBS.

References Cited in the file of this patent

UNITED STATES PATENTS

| Number | Name | Date |
|---|---|---|
| 1,861,797 | Holt | June 7, 1932 |
| 2,362,637 | Keehn | Nov. 14, 1944 |
| 2,395,053 | Landis | Feb. 19, 1946 |